July 7, 1970   F. E. HUNTOON   3,518,747

METHOD OF MOUNTING BEARINGS

Filed Aug. 15, 1967

INVENTOR
FRANCIS E. HUNTOON

BY R.C. Terry

ATTORNEY

United States Patent Office 3,518,747
Patented July 7, 1970

3,518,747
METHOD OF MOUNTING BEARINGS
Francis E. Huntoon, Des Plaines, Ill., assignor to Teletype Corporation, Skokie, Ill., a corporation of Delaware
Filed Aug. 15, 1967, Ser. No. 660,723
Int. Cl. B23p *11/02;* B21d *53/10*
U.S. Cl. 29—446                                        11 Claims

ABSTRACT OF THE DISCLOSURE

A method of mounting antifriction bearings in connecting rods including the steps of forming two bearing receiving holes in each of two connecting rod halves, forming a pin receiving hole through each connecting rod half at a point displaced from a line betwen the centers of the bearing receiving holes therein, positioning the two connecting rod halves one on top of the other with each bearing receiving hole in each half axially aligned with a bearing receiving hole in the other half and with the pin receiving hole in one half axially misaligned with the pin receiving hole in the other half, inserting a bearing into the aligned bearing receiving holes in each of the two halves, distorting the two halves with respect to each other to bring the pin receiving holes into axial alignment thereby imparting a gripping stress upon each of the bearings and inserting a pin through the aligned pin receiving holes to maintain the connecting rod halves in the distorted condition.

BACKGROUND OF THE INVENTION

Antifriction bearings are typically secured in connecting rods or other bearing supporting members by means of set screws, keys, etc. which bear against the outer races of the bearings or by means of an interference fit between the bearings and their supporting members. Both of these methods are time consuming and costly because they necessitate the use of accurate machining and/or hand labor.

SUMMARY OF THE INVENTION

In the preferred embodiment of the invention bearings are mounted in inexpensively manufactured ssupporting members with a minimum of labor by a method including the steps of positioning a bearing in at least two cooperating bearing supporting members, distorting the bearing supporting members with respect to each other to impose a gripping stress on the bearing and securing the bearing supporting members in the distorted condition.

DESCRIPTION OF THE DRAWING

A more complete understanding of the invention may be had by referring to the following detailed description when taken in conjunction with the drawings wherein.

DETAILED DESCRIPTION

Figure 1:
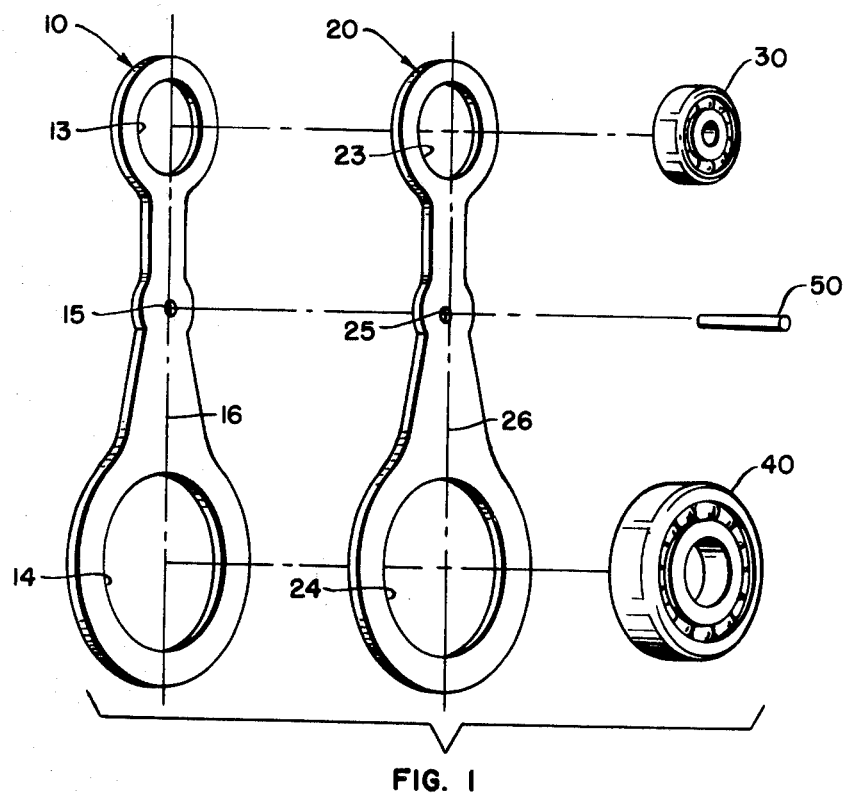
FIG. 1 is an exploded, perspective view of the components used in practicing one embodiment of the invention.

Referring now to the drawing, wherein like reference numerals designate like parts throughout the several views, with particular reference being had to FIG. 1, there is shown a pair of connecting rod halves or portions 10 and 20 which together form the body of a complete connecting rod. The connecting rod half 10 has a small bearing receiving hole 13 formed through its upper end, a large bearing receiving hole 14 formed through its lower end and a jam pin receiving hole 15 formed through its center at a point just to the right (FIG. 1) of a line 16 extending between the centers of the holes 13 and 14. The connecting rod half 20 similarly has a small bearing receiving hole 23 formed through its upper end, a large bearing receiving hole 24 formed through its lower end and a jam pin receiving holes 25 formed through its center, but at a point just to the left (FIG. 1) of a line 26 extending between the centers of the holes 23 and 24. In practice, the halves 10 and 20 may be conveniently manufactured by stamping identical pieces from sheet stock and then positioning opposite sides of the resulting parts adjacent each other.

Figure 2:
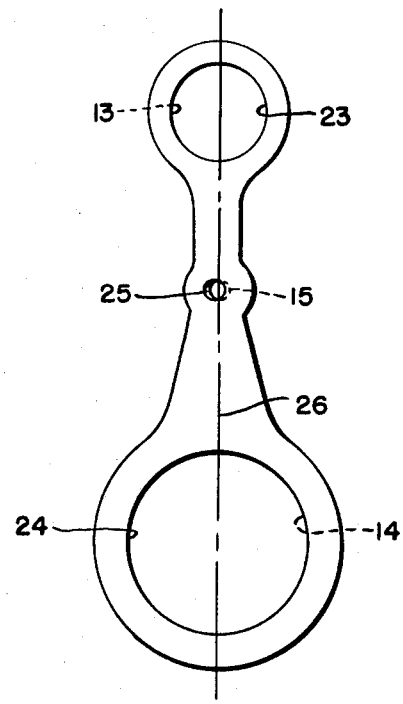
FIG. 2 is a top view of two of the components shown in FIG. 1 showing the orientation of the various holes in the components.

During assembly the halves 10 and 20 are positioned as shown in FIG. 2 with the holes 13 and 23 in axial alignment, with the holes 14 and 24 likewise in axial alignment and with the holes 15 and 25 positioned on opposite sides of a line extending between the centers of the aligned holes. A bearing 30 is loosely inserted in the aligned holes 13–23 and a bearing 40 is loosely inserted in the aligned holes 14–24. The halves 10 and 20 are then bent with respect to each other along the lines 16 and 26 respectively to bring the pin receiving holes 15 and 25 into axial alignment whereupon a jam pin 50 is inserted into the aligned holes 15 and 25 to fix the halves 10 and 20 in the distorted condition. The bending of the halves 10 and 20 imposes a gipping force on the bearings 30 and 40 and the insertion of the pin 50 into the holes 15 and 25 assures that the gripping force will continue to be imposed on the bearings thereby assuring the retention of the bearings in the finished connecting rod.

Although only two connecting rod halves 10 and 20 are shown in the drawing it has been found in practice that it is better to use at least three connecting rod portions the outside two of which have their jam pin receiving holes positioned to one side of the line between their bearing receiving holes and the center one of which has its jam pin receiving hole positioned on the other side to prevent cocking of the bearings in the finished connecting rod. It is, of course, unnecessary to use connecting rods in the practice of the invention and any suitable bearings supporting members may be used so long as they are each provided with matched sets of bearing supporting members such as the identically sized and located bearing receiving holes 13 and 14 and 23 and 24 in the connecting rod halves 10 and 20.

It should also be apparent that the use of the jam pin 50 is not required in the practice of the method. For example, it may be desirable to drill and tap a threaded hole into the bearing supporting members while the members are in a distorted condition and then to insert a threaded fastener through the members. Or, it may be desirable to spot-weld the bearing supporting members while they are in the distorted condition. As an alternative to the method described one of the bearing supporting members can be made shorter than the other and then stretched, either mechanically or by means of heat, to allow insertion of the bearings. Such an embodiment requires no retaining means whatsoever. And, one of the bearing supporting members may be provided with means for engaging and resisting movement of the other supporting members and then the two members may be distorted with respect to each other to grip a single bearing.

What is claimed is:

1. A method of mounting first and second bearings including the steps of:
   mounting the first and second bearings in two bearing supporting members; and
   distorting at least one of the bearing supporting members to impose bearing retaining stresses on each bearing.

2. The method of mounting bearings according to claim 1 wherein the step of mounting a first bearing in two bearing supporting members and of mounting a second bearing in the bearing supporting members both include the step of forming bearing receiving holes in the bearing supporting members.

3. The method of mounting bearings according to claim 1 further including the step of securing the bearing supporting members in the distorted condition.

4. The method of mounting bearings according to claim 3 wherein the step of securing the bearing supporting members in the distorted condition includes the step of fixing the bearing supporting members one to the other while the bearing supporting members are in the distorted condition.

5. The method of mounting bearings according to claim 4 wherein the step of distorting the bearing supporting members includes the step of bending the bearing supporting members with respect to each other.

6. A method of mounting bearings including the steps of:
   forming bearing receiving holes in at least two bearing supporting members;
   mounting a bearing in the bearing receiving holes in the supporting members;
   distorting the bearing supporting members with respect to each other to impose a bearing retaining stress on the bearing; and
   affixing the bearing supporting members in the distorted condition.

7. The method of mounting bearings according to claim 6 wherein the step of distorting the bearing supporting members is carried out by bending the bearing supporting members with respect to each other.

8. The method of mounting bearings according to claim 6 wherein the step of affixing the bearing supporting members in the distorted condition is carried out by passing a retaining member through the bearing supporting members while the supporting members are in the distorted condition.

9. A method of mounting bearings in connecting rods including the steps of:
   forming matched pairs of bearing receiving holes in two connecting rod portions;
   forming a jam pin receiving hole in each of the connecting rod portions at a point displaced from a line connecting the centers of the bearing receiving holes therein;
   positioning the connecting rod portions in engagement with each other and with corresponding bearing receiving holes in the two portions axially aligned;
   mounting a bearing in each of the aligned pairs of bearing receiving holes;
   distorting the connecting rod portions to bring the jam pin receiving holes into axial alignment thereby placing a gripping stress on the bearings in the bearing receiving holes; and
   inserting a jam pin in the aligned jam pin receiving holes to retain the connecting rod portions in the distorted condition thereby retaining the bearings in the connecting rod formed from the halves.

10. The method of mounting bearings according to claim 9 wherein the matched pairs of bearing receiving holes are formed at the ends of the two connecting rod portions and wherein the jam pin receiving holes are formed between the bearing receiving holes in each connecting rod portion.

11. The method of mounting bearings according to claim 10 wherein the jam pin receiving hole in each connecting rod portion is formed at a point displaced from the line between centers of the bearing receiving holes in the portion by a distance which is small compared to the distance between the centers of the bearing receiving holes in the portion.

References Cited

UNITED STATES PATENTS

| 2,513,643 | 7/1950 | Griner | 308—24 |
| 2,628,136 | 2/1953 | Pittman | 308—23 |
| 2,982,883 | 5/1961 | Gordy | 317—101 |

GERALD A. DOST, Primary Examiner

U.S. Cl. X.R.

29—149.5; 308—236